Feb. 16, 1954     J. L. SCHROEDER     2,669,219

FEED TROUGH FOR HOGS AND THE LIKE

Filed Feb. 27, 1952

INVENTOR
JOHN L. SCHROEDER

BY

ATTORNEYS

Patented Feb. 16, 1954

2,669,219

UNITED STATES PATENT OFFICE 2,669,219

FEED TROUGH FOR HOGS AND THE LIKE

John L. Schroeder, Watertown, Wis.

Application February 27, 1952, Serial No. 273,612

1 Claim. (Cl. 119—61)

This invention appertains to animal feeders and more particularly to a new and novel feed trough for hogs and the like.

A primary object of my invention is to provide an improved feed trough of the general type disclosed in my co-pending application, Serial No. 214,253, filed March 7, 1951 for Animal Feeders, which application issued on June 23, 1953 as U. S. Patent Number 2,642,837.

Another important object of my invention is to provide a feed trough in which the upper side edges are inwardly rolled or curled so that wet feed which may be splashed upwardly will be directed back toward the bottom of the trough.

A further object is to form all upper edges with rounded upper surfaces to eliminate sharp edges thereby preventing injury to the animals using the trough.

Still another object of my invention is to provide spacer bars extending transversely across the trough defining spaces for the individual animal to feed.

A salient feature of my invention is to provide the feed trough with a removable partition which will act to restrict the active size of the trough when desired.

A still further object is to provide a feed trough which is simple in construction, reliable in its operation, and not likely to get out of order.

With these and other objects in view the invention consists in the novel construction, arrangement and formation of parts, as will hereinafter be more specifically described, claimed and illustrated in the accompanying drawings.

In the drawings:

Figure 1 is a perspective view of my feed trough clearly showing the partition plate and spacer bars;

Figure 2 is a longitudinal vertical section through the feed trough taken on the line 2—2 of Figure 1 and looking in the direction of the arrows;

Figure 3 is a longitudinal horizontal section through the feed trough taken on the line 3—3 of Figure 2 and looking in the direction of the arrows;

Figure 4 is a transverse section through the trough taken on the line 4—4 of Figure 2 looking in the direction of the arrows;

Figure 5 is a transverse section taken on the line 5—5 of Figure 2 looking in the direction of the arrows and illustrating in particular certain details in the construction of the removable partition; and Figure 6 is an enlarged fragmentary view in section of one of the rounded upper side edges which serves the two fold purpose of directing the wet feed back into the trough and preventing injury to the animals in feeding.

Referring to the drawings in detail wherein similar reference characters designate corresponding parts throughout the several views the letter "T" generally indicates one type of my improved trough which is preferably constructed of sheet metal. While the bottom, sides and end walls of the trough may all be separated pieces, in the preferred form, I utilize a single elongated sheet of metal bent along the two longitudinal and parallel lines 11 to form the flat bottom portion 12 and the upwardly directed flat sides 13 and 14 of the trough. The upper edges 15 and 16 of the sides 13 and 14 respectively are inwardly rolled or curled to form the internal flange 17. Flange 17 not only acts as a splash guard for directing the wet mash material down and back into the trough as indicated by the arrows in Figure 6 of the drawings, but the rounded upper surfaces 15 and 16 of the in-turned flanges 17 also eliminate sharp edges and prevent injury to the animals using the trough "T."

The trough is provided with end walls 18 and 19 each of which is suitably bolted to the respective in-turned side portions 20 and upwardly extending bottom portion 21 of the sides 13 and 14 and bottom 12. The sharp upper edges of the end wall members 18 and 19 are each covered with a U shaped rounded clip bar 19' which may be bolted in place and also serves to prevent injury to the animal while feeding. The end walls 18 and 19 extend beyond the sides of the trough "T" and for additional stability are provided with outwardly extending base portions 22 which in turn have formed therein a series of small apertures 23 through which suitable clamping devices, such as, bolts or the like, may be placed to firmly hold the trough to a wood supporting surface. If the trough is to be used out in the pen it may rest directly upon the ground or the bases 22 may be bolted to 2 x 4's for further support.

Extending transversely across the top of the trough from edge 15 to edge 16 are a series of spacer bars 24. The spacer bars 24 are removably secured to the upper edges 15 and 16 by means of the bolts 24' and form separate spaces from which each animal may feed.

The trough "T" is also provided with removable partition member 25 which serves to limit the active portion of the feed trough. The partition 25 includes the partition plate 26 which is welded or otherwise secured to the under portion of one of the spacer bars 25'. The rectangular plate 26 has the same dimensions as the interior cross section of the trough "T" and each end thereof is received in U-shaped vertical channels 27 and 28 respectively. The U-shaped vertical channels 27 and 28 are identically formed from a pair of thin vertical strips 29 welded or otherwise secured to the respective side 13 or 14. It is obvious that the trough "T" could be so arranged that the removable partition 25 could be substituted for any one of the spacer bars 24, as desired. This partition is important in that it conserves space if a relatively few animals are to feed and it may, if desired, provide one compartment 30 for the wet mash and other compartment 31 for water or the like.

Changes in detail may be made without departing from the spirit or scope of this invention but what I claim as new is:

A feed trough for animals comprising, bottom, side and end walls, each side wall having formed on its inner surface a vertical U channel arranged in spaced parallel relation and being inturned along the upper edge to form an inner splash guard flange and an outer rounded surface, a slot extending transversely across the inner splash guard flange of each side wall, a series of parallel spacer bars extending transversely across the upper edges of the trough, providing individual spaces for each animal, and a removable partition received in said channels and slots and extending transversely across the trough, said partition being secured to and depending from one of the said spacer bars.

JOHN L. SCHROEDER.

References Cited in the file of this patent

UNITED STATES PATENTS

| Number | Name | Date |
|---|---|---|
| 487,836 | Hurst | Dec. 13, 1892 |
| 733,448 | Williams | July 14, 1903 |
| 809,958 | Kennedy | Jan. 16, 1906 |
| 856,564 | Baese | June 11, 1907 |
| 1,172,913 | Slater | Feb. 22, 1916 |
| 1,794,589 | Collins | Mar. 3, 1931 |
| 1,808,657 | Hawkins | June 2, 1931 |
| 2,342,180 | Crim | Feb. 22, 1944 |